Patented Nov. 25, 1930

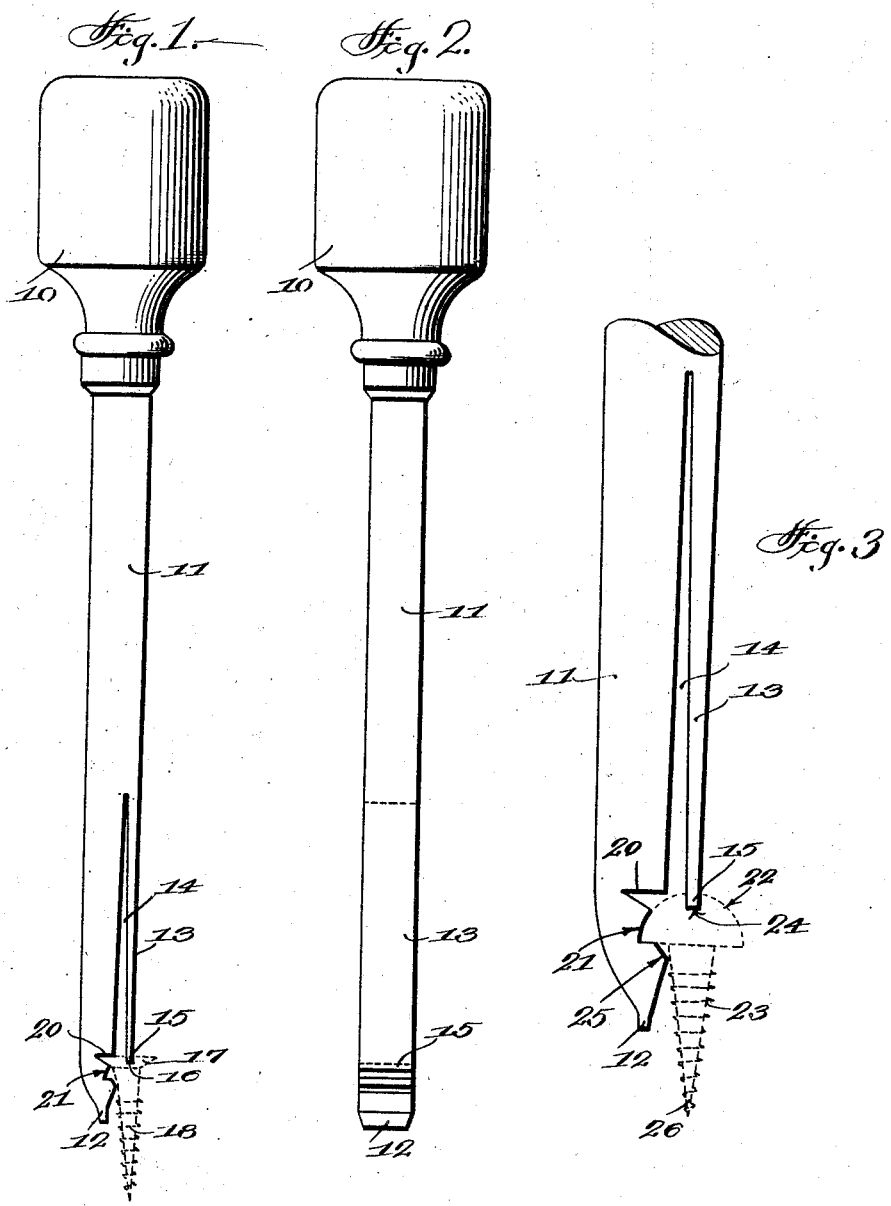

1,783,070

UNITED STATES PATENT OFFICE

FREDERICK R. BERGEMANN, OF PUEBLO, COLORADO

SCREW DRIVER

Application filed March 22, 1930. Serial No. 438,093.

This invention relates to screw drivers.

An object of the invention is the provision of a screw driver in which the shank is provided with an auxiliary blade adapted to engage the usual groove in the head of a screw with the shank having a notch adjacent the free end of the auxiliary blade to receive the head so that the screw will be supported by the shank for initially forcing the screw into the work, the shank being provided with the usual blade for driving the screw into the work after its initial start.

A further object of the invention is the provision of a screw driver having a shank and a main blade for forcing screws into a piece of work, said shank being equipped with an auxiliary blade having a free end terminating adjacent notches in the shank, said notches being adapted to receive and in connection with the auxiliary blade support a screw on the shank for initially forcing the screw into the work preliminarily to the complete driving of the screw into the work.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a view in elevation of a screw driver constructed in accordance with the principles of my invention and shown supporting a flat-headed screw, Figure 2 is a view in elevation of my improved screw driver which is at right angles to the view shown in Figure 1, Figure 3 is a fragmentary view in elevation of the shank of the screw driver supporting a round-headed screw.

Referring more particularly to the drawings, 10 designates a handle which is secured in any approved manner to a shank 11. The outer free end of the shank is reduced, as shown at 12, to provide a blade which is adapted to engage the usual slot in a wood screw for forcing the screw into said wood.

An auxiliary blade 13 is formed integrally with the shank 11 by providing a longitudinally disposed V-shaped slot 14. This auxiliary blade has a free end 15 adapted to engage a groove 16 formed in a flat head 17 of a screw 18.

The shank is provided with a V-shaped notch 20 adapted to receive a portion of the flat head 17 of the screw 18 so that when the free end 15 of the auxiliary blade 13 is engaged within the slot 16 of the screw 18, the screw will be supported by the shank. When the handle 10 is revolved the screw 18 will be initially forced into the wood a predetermined distance. The free end of the auxiliary blade is then removed from the groove 16 when the head is released from the notch 20. The blade 12 is then placed within the notch 16 of the screw and the handle is again revolved, forcing the screw completely into the work. It will be noted by this construction that the auxiliary blade is to be employed only for the initial threading of the screw into the work since it is not sufficiently strong to stand the strain of threading the screw completely into the work.

The shank 11 adjacent the notch 20 is provided with a second notch 21 which conforms to the shape of a round head 22 of a screw 23. This round head is also provided with a notch 24 to receive the free end 15 of the auxiliary blade 13. The round headed screw is supported on the shank when the portion of the head rests upon the seat 21 in the shank 11 and when the free end of the auxiliary blade is engaged within the groove of the screw. The screw in this position on the shank 11 is forced a predetermined distance into the work after which the shank is removed from the head of the screw and the blade 12 is employed for forcing the screw into the work and up to the bottom of the head 22.

The auxiliary blade 13 is of resilient material and is formed either by cutting the V-shaped slot 14 into the shank 11 or the shank may be cut away and the auxiliary blade removably secured to the shank.

The shank, as shown at 25, is cut away so that it will neatly fit beneath the head 22 of the screw 23 in order to maintain the point 26 of the screw in alinement with the blade 13.

I claim:

1. A screw driver comprising a handle, a shank carried by the handle, the free end of the shank having a blade for engagement with a groove in the head of a screw, the shank being provided with a notch forming a seat to receive a portion of the head of a screw, a resilient blade connected to the shank and having a free end terminating adjacent the notch for engaging a groove of the screw and for retaining the head in the notch.

2. A screw driver comprising a handle, a shank carried by said handle and provided with notches to receive the head of a screw, a spring blade formed integrally with the shank and having a free end spaced from the notches and adapted to engage a groove in the head of the screw for turning the screw when the handle is revolved and co-operating with the notch for supporting the screw in the shank.

3. A screw driver comprising a handle, a shank carried by the handle and provided with means to receive the head of a screw, a spring blade connected with the shank and having a free end terminating adjacent the head receiving means in the shank and adapted to engage the usual groove in the head of the screw for not only providing for rotation of the screw when the handle is revolved but for aiding in retaining the head of the screw on its seat in the shank.

FREDERICK R. BERGEMANN.